(12) United States Patent
Iwamura et al.

(10) Patent No.: US 8,889,762 B2
(45) Date of Patent: Nov. 18, 2014

(54) DYE INK FOR INK-JET RECORDING, INK SET INCLUDING THE SAME, INK-JET RECORDING APPARATUS, AND INK-JET RECORDING METHOD

(75) Inventors: Yuko Iwamura, Nagoya (JP); Hitomi Sadohara, Nagoya (JP); Akiko Miyajima, Aichi-ken (JP)

(73) Assignee: Brother Kogya Kabushiki Kaisha, Nagoya-Shi, Aichi-Ken (JP)

( * ) Notice: Subject to any disclaimer, the term of this patent is extended or adjusted under 35 U.S.C. 154(b) by 487 days.

(21) Appl. No.: 12/550,469

(22) Filed: Aug. 31, 2009

(65) Prior Publication Data

US 2010/0056704 A1    Mar. 4, 2010

(30) Foreign Application Priority Data

Sep. 2, 2008   (JP) ................................. 2008-225020

(51) Int. Cl.

| | | |
|---|---|---|
| B41J 2/01 | (2006.01) | |
| B41J 2/17 | (2006.01) | |
| C08F 220/04 | (2006.01) | |
| C08F 222/40 | (2006.01) | |
| C08G 73/10 | (2006.01) | |
| C08K 5/05 | (2006.01) | |
| C08K 5/06 | (2006.01) | |
| C08L 37/00 | (2006.01) | |
| C08L 39/00 | (2006.01) | |
| C09D 5/00 | (2006.01) | |
| C09D 11/00 | (2014.01) | |
| G01D 11/00 | (2006.01) | |
| C09D 11/40 | (2014.01) | |

(52) U.S. Cl.
CPC ...................................... *C09D 11/40* (2013.01)
USPC ................ 523/160; 347/1; 347/95; 347/100; 523/161; 524/376; 524/379; 524/386; 524/548

(58) Field of Classification Search
USPC ......... 347/1, 95, 100; 523/160, 161; 524/376, 524/379, 386, 548
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 6,755,508 B2 * | 6/2004 | Doi | 347/43 |
| 6,811,251 B2 | 11/2004 | Kinomoto et al. | |
| 7,244,296 B2 | 7/2007 | Kato et al. | |
| 7,281,789 B2 | 10/2007 | Goto et al. | |
| 2003/0218662 A1 | 11/2003 | Kinomoto et al. | |
| 2004/0233263 A1 | 11/2004 | Goto et al. | |
| 2006/0082629 A1 | 4/2006 | Kato et al. | |

FOREIGN PATENT DOCUMENTS

| | | |
|---|---|---|
| JP | S63-299971 A | 12/1988 |
| JP | 08-003498 | 1/1996 |
| JP | 2000-513396 | 10/2000 |
| JP | 2003-096338 | 4/2003 |
| JP | 2003-147241 | 5/2003 |
| JP | 2003-334940 A | 11/2003 |
| JP | 2004-107637 A | 4/2004 |
| JP | 2004-346160 A | 12/2004 |
| JP | 2006-274091 A | 10/2006 |

OTHER PUBLICATIONS

Notice of Reasons for Rejection for Japanese Patent Application No. 2009-201332 mailed Nov. 27, 2012 and its partial English translation.

Notice of Reasons for Rejection of corresponding Japanese Patent Application No. 2009-201332, dated Sep. 2, 2013.

* cited by examiner

*Primary Examiner* — Patrick Niland
(74) *Attorney, Agent, or Firm* — Banner & Witcoff, Ltd.

(57) ABSTRACT

An ink set for ink-jet recording includes a dye ink containing a water-soluble dye and water and a pigment ink containing a self-dispersible pigment and water; wherein the dye ink further contains a polymer having a lactam structure; and the pigment ink further contains a substance having a surface active ability, a blending amount of the substance having the surface active ability being set in a ratio to fulfill a condition that a line width of a one-dot line is not less than 115 μm when an amount of one liquid droplet of the pigment ink to be discharged is set to be within a range of 22 pL to 28 pL and the one-dot line is printed on a regular paper sheet.

8 Claims, 2 Drawing Sheets

DYE INK FOR INK-JET RECORDING, INK SET INCLUDING THE SAME, INK-JET RECORDING APPARATUS, AND INK-JET RECORDING METHOD

CROSS REFERENCE TO RELATED APPLICATION

The present application claims priority from Japanese Patent Application No. 2008-225020 filed on Sep. 2, 2008 the disclosure of which is incorporated herein by reference in its entirety.

BACKGROUND OF THE INVENTION

1. Field of the Invention

The present invention relates to a dye ink for ink-jet recording, an ink set including the dye ink for ink-jet recording, an ink-jet recording apparatus, and an ink-jet recording method.

2. Description of the Related Art

An ink set, which includes a dye ink containing a water-soluble dye and water and a pigment ink containing a pigment and water, has been hitherto widely used as an ink set for inkjet recording. However, the pigment ink, which constitutes the ink set, involves such a problem that the pigment ink has low permeability into a recording medium such as a printing paper sheet. Further, the pigment ink involves such a problem that the pigment tends to coagulate or aggregate and the pigment is inferior in the dispersion stability in the pigment ink. Further, the inventors of the present invention recognize the following problem associated with the dispersion stability of the pigment ink. For example, the pigment ink which is inferior in the dispersion stability is brought in contact with a dye ink in an ink-jetting surface (jetting surface) of an ink-jet recording head, in some cases. This situation happens, for example, when the jetting surface of the ink-jet recording head is wiped with a wiper so as to perform cleaning for the jetting surface. When the pigment ink which is inferior in the dispersion stability as described above and the dye ink are brought in contact with each other on the jetting surface, these inks are easily solidified, which in turn causes clog-up of the nozzle holes formed in the jetting surface for the following reason. Namely, when the pigment ink and the dye ink makes contact with each other, then the aggregation of the pigment occurs to some extent at the boundary between the pigment and dye inks. Next, due to vaporization of volatile component(s) in the ink(s), the aggregation of the pigment is further advanced, which in turn causes the solidification of the ink(s). This problem is very serious in the ink-jet head having a construction in which a plurality of color inks are jetted from a single jetting surface.

The problem concerning the permeability can be solved by adding a substance having a surface active ability including, for example, a penetrant and a surfactant to the pigment ink so as to enhance the permeability of the pigment ink into the recording medium. In order to solve the problem concerning the dispersion stability of the pigment in the pigment ink, a pigment ink, to which a polymer is added, has been suggested (Japanese Patent Application Laid-open Nos. 2003-96338 and 2003-147241).

However, if the amount of addition of the substance having the surface active ability is increased in the pigment ink which constitutes the ink set, then the solidification tends to occur and the nozzle of the ink-jet head tends to be clogged up when the pigment ink is brought in contact with the dye ink in the vicinity of the nozzle of the ink-jet head and the vaporization occurs, for the reason as described above. This causes discharge failure, unsatisfactory discharge or undischarge. On the other hand, if the polymer is added to the pigment ink for the purpose of improving the dispersion stability of the pigment in the pigment ink, then there is caused another problem that the optical density (OD value) of the printed matter is lowered, although the dispersion stability is improved. Accordingly, by merely adding the polymer to the pigment ink so as to solve the above conventional problem, it is not possible to obtain any satisfactory printing quality.

On the other hand, the dye ink has a problem that the dye ink is generally inferior in the migration. The migration refers to, for example, such a situation that after a tri-color black is printed by using the dye inks of three colors of yellow ink, magenta ink, and cyan ink on a glossy paper sheet, a part or parts of a dye ink or dye inks is/are blurred to the circumferential edge of a printed portion of the tri-color black.

SUMMARY OF THE INVENTION

In view of the above, an object of the present invention is to provide an ink set for ink-jet recording wherein the permeability and the optical density of a pigment ink are high, the discharge failure or the undischarge, which would be otherwise caused by the clog-up of the nozzle, is not caused even when the pigment ink and a dye ink are brought in contact with each other in the vicinity of the nozzle of the ink-jet head, and the migration of the dye ink is satisfactory.

According to a first aspect of the present invention, in order to achieve the object described above, there is provided an ink set for ink-jet recording including a dye ink which contains a water-soluble dye and water and a pigment ink which contains a self-dispersible pigment and water; wherein the dye ink further contains a polymer having a lactam structure; and the pigment ink further contains a substance having a surface active ability, a blending amount of the substance having the surface active ability being set in a ratio to fulfill a condition that a line width of a one-dot line is not less than 115 μm when an amount of one liquid droplet of the pigment ink to be discharged is set to be within a range of 22 pL to 28 pL and the one-dot line is printed on a regular paper sheet.

According to a second aspect of the present invention, there is provided a dye ink which contains a water-soluble dye, water and a polymer having a lactam structure.

As described above, it is known that polymer is added to a pigment ink for the purpose of improving the dispersion stability of the pigment in the pigment ink. However, in the present invention, the polymer having the lactam structure is blended in the dye ink included in the ink set for ink-jet recording. The following merits can be obtained when the dye ink contains the polymer having the lactam structure. (i) Even when the pigment ink and the dye ink are brought in contact in the vicinity of the nozzle in the ink-jet head, the polymer having the lactam structure, which is contained in the dye ink, acts on the pigment of the pigment ink so as to prevent the solidification of the inks, thereby preventing unsatisfactory jetting or jetting failure which would be otherwise caused by the clog-up of the nozzle. As a result, there is less necessity to add a polymer to the pigment ink for the purpose of improving the dispersion stability of the pigment. Further, (ii) since any polymer is not added to the pigment ink or a very small amount of the polymer is enough even if the polymer is to be added to the pigment ink, it is possible to maintain the OD value of the pigment ink to be high. In particular, when the polymer having the lactam structure is blended in only the dye ink in the ink set of the present invention as in embodiment which will be described later on, it is possible to further increase the optical density of the pigment ink. Furthermore, (iii) Even though the substance having the surface active ability such as the surfactant is added to the pigment ink in a relatively large amount, the problem of the solidification due to the contact of the dye and pigment inks, which is associated with the conventional technique, does not occur owing to the effects described in the above item (i). Therefore, it is possible to remove the limitation in the amount of the substance having the surface active ability to be added to the pigment ink. Therefore, in the ink set of the present invention, the substance having the surface active ability can be blended in an amount sufficient to fulfill the condition of the line width as described above, and it is possible to enhance the permeability of the pigment ink. Further, in the ink set of the present invention, the polymer having the lactam structure is especially selected and blended as the polymer to suppress the aggregation or coagulation of the self-dispersible pigment. By doing so, even when the pigment ink and the dye ink are brought in contact with each other in the vicinity of the nozzle of the ink-jet head, the discharge failure, which would be otherwise caused by the clog-up of the nozzle, is not caused. In the following, this effect is briefly explained with reference to FIG. 2.

Figure 2:
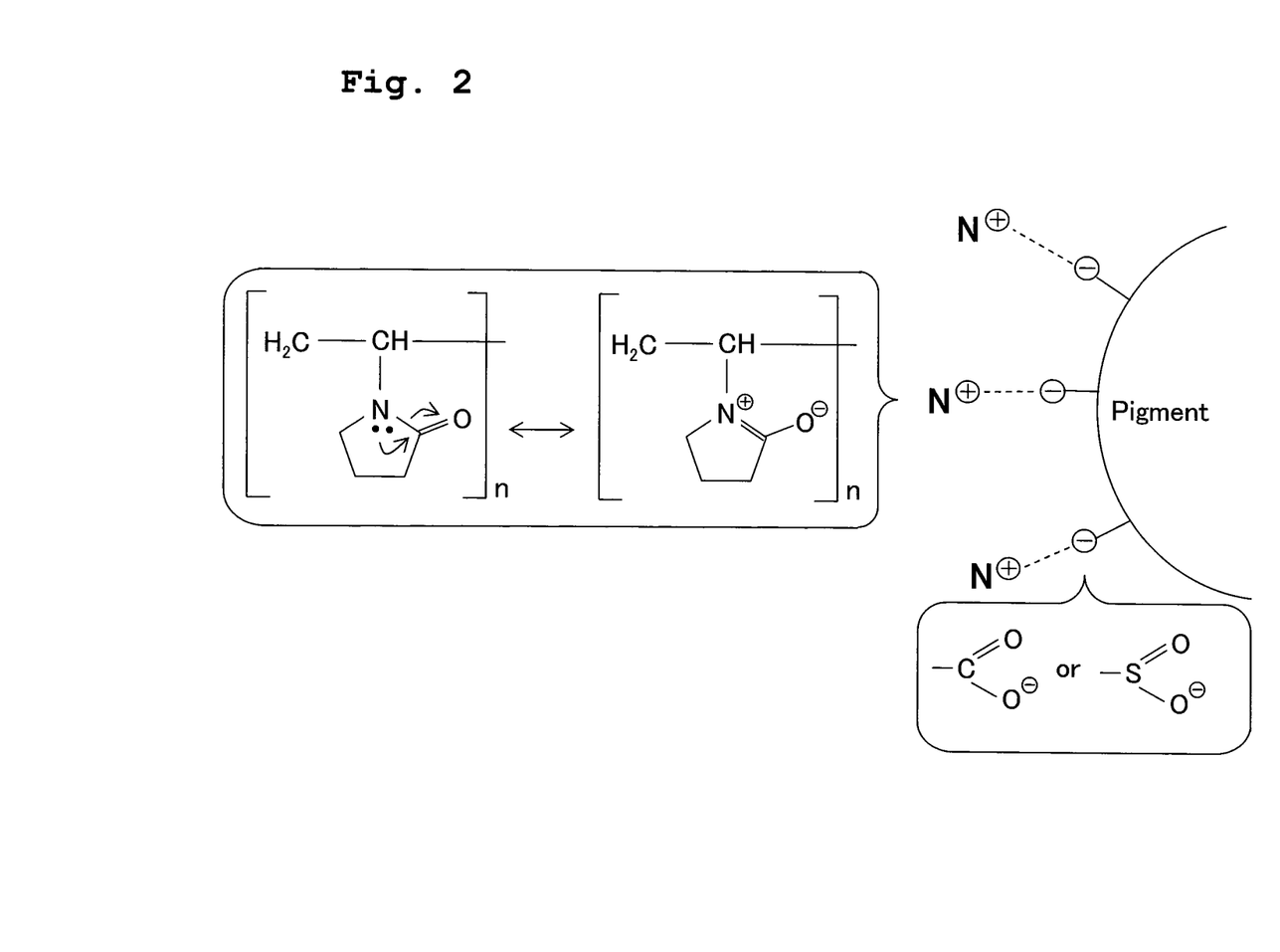
FIG. 2 is a view for explaining the effect of a polymer having the lactam structure with respect to the pigment.

For example, as shown in FIG. 2, the polymer having the lactam structure can be expressed by a resonance structural formula in which the electron is moved between nitrogen in the lactam and the carbonyl group to which the nitrogen is bonded. When the polymer having such a γ-lactam structure is added to the pigment ink containing the self-dispersible pigment, the positively-charged (+) nitrogen in the lactam is attracted by negatively-charged (−) oxygen in the carbonyl group or sulfon group existing on the surface of the self-dispersible pigment, and the polymer having the γ-lactam structure wholly covers around the pigment particle. Here, although the self-dispersible pigment has, as the counter ion, a cation such as sodium ion, the nitrogen of the lactam has lower ionization tendency than the cation; and thus it is considered that the nitrogen of lactam is more easily bonded with the oxygen of the carbonyl group or sulfon group existing on the surface of the self-dispersible pigment, than the cation of the self-dispersible pigment. With this, it is considered that the coagulation or aggregation of the pigment particle is prevented. Note that when the molecular weight of the polymer is grater, one polymer can consequently surround a several pieces of the pigment particle. With this, it is considered that the aggregation is easily occurred in such a situation. Therefore, in the present invention, it is preferable that the molecular weight of the polymer having the lactam structure is small.

The inventors also found out, in addition to the above effects or merits, that it is possible to suppress the migration of the dye ink by adding the polymer having the lactam structure to the dye ink for ink-jet recording. The reason for this can be explained, based on the structural formula of the polymer having the lactam structure as shown in FIG. 2, as follows. The migration, in which a part or parts of a dye ink or dye inks is/are blurred to the circumferential edge of a printed portion of the tri-color black, is considered to be caused due to the movement of dye in, for example, a receiving layer of a glossy paper. In the dye ink of the present invention, the negatively-charged (−) oxygen in the group such as calboxyl group in the dye is electrically attracted by the positively-charged (+) nitrogen in the lactam; the polymer covers around the dye; and the apparent size of the dye becomes larger (molecular weight becomes larger). As a result, it is considered that such a large dye is suppressed from moving in the receiving layer of the glossy paper. In this case also, since the nitrogen of the lactam has lower ionization tendency than the cation as the counter ion of the dye, it is considered that the nitrogen of lactam is more easily and preferentially bonded with the oxygen of the carbonyl group or sulfon group existing on the surface of the dye.

Accordingly, in the ink set of the present invention, by blending the polymer having the lactam structure to the dye ink, there is obtained the synergy for realizing the following four effects at the same time, namely: (i) the ink solidification, which would be otherwise caused by the contact of the dye and pigment inks, is suppressed to thereby prevent the clog-up of the nozzle; (ii) the optical density of the pigment ink is increased; (iii) the permeability of the pigment ink is improved; and (iv) the migration of the dye ink is suppressed.

DESCRIPTION OF THE PREFERRED EMBODIMENTS

In the present invention, the term "regular paper" or "regular paper sheet" refers to paper or paper sheet in which any special processing or any special coating treatment is not applied to a surface thereof, including, for example, high quality paper to be used for notebooks and report paper sheets and copy paper applied with no coating. The regular paper includes, for example, Laser Print produced by Hammermill, DATE COPY paper produced by M-real, Xerox 4200 produced by XEROX, High Quality Regular Paper BP60PA as exclusive paper produced by Brother Industries, Ltd., 4200DP PAPER 20LB produced by Fuji Xerox Office Supply, etc. In the present invention, the regular paper is used merely in order to evaluate the permeability of the pigment ink; and the recording medium is not limited to the regular paper.

The dye ink of the ink set for ink-jet recording of the present invention contains the polymer having the lactam structure for the above-described functions or actions. The lactam structure includes, for example, the α-lactam structure, the β-lactam structure, the γ-lactam structure, the δ-lactam structure, and the ε-lactam structure. However, it is preferable that the lactam structure is the γ-lactam structure in order that the above-described effects of the present invention are fully realized.

In the ink set for ink-jet recording of the present invention, it is preferable that the polymer, which has the γ-lactam structure, has a weight average molecular weight of less than 25,000. When the weight average molecular weight is less than 25,000, it is possible to obtain the ink set which is more excellent in the vaporization characteristic of the pigment ink. The lower limit value of the weight average molecular weight is not specifically limited. However, the lower limit value is, for example, 5,000 and preferably 9,000.

In the ink set for ink-jet recording of the present invention, the polymer having the γ-lactam structure is not specifically limited. It is preferable to use, for example, polyvinylpyrrolidone. One type of the polymer having the γ-lactam structure may be used singly, or two or more types of the polymers having the γ-lactam structure may be used in combination.

In the ink set for ink-jet recording of the present invention, it is preferable that the substance having the surface active ability is at least one of a penetrant and a surfactant. In this case, it is preferable that the penetrant is a glycol ether compound having a number of carbon atoms of a main chain of 5 to 10, and that the surfactant is an acetylene diol compound.

In the ink set for ink-jet recording of the present invention, it is preferable that the polymer having the lactam structure is contained only in the dye ink. Accordingly, it is possible to obtain the ink set in which the pigment ink has a higher optical density.

In the ink set for ink-jet recording of the present invention, it is preferable that the self-dispersible pigment is a self-dispersible black pigment; and the dye ink includes at least one water-soluble dye selected from the group consisting of yellow water-soluble dyes, magenta water-soluble dyes, and cyan water-soluble dyes.

According to the present invention, there is provided an ink-jet recording apparatus including: an ink-accommodating section; and an ink discharge section, the ink-jet recording apparatus discharging inks accommodated in the ink-accommodating section by the ink discharge section, wherein the inks, which constitute the ink set for ink-jet recording of the present invention, are accommodated in the ink-accommodating section.

According to the present invention, there is provided an ink-jet recording method for performing recording on a surface of a recording medium by discharging inks, wherein the inks, which constitute the ink set for ink-jet recording of the present invention, are used as the inks.

Next, the ink set for ink-jet recording of the present invention will be explained in detail. The ink set for ink-jet recording of the present invention includes the dye ink which contains the water-soluble dye and water and the pigment ink which contains the self-dispersible pigment and water.

At first, the dye ink will be explained. The water-soluble dye of the dye ink is not limited, and includes, for example, direct dyes, acid dyes, basic dyes, reactive dyes, etc. It is preferable that the dye ink contains at least one water-soluble dye selected from the group consisting of yellow water-soluble dyes, magenta water-soluble dyes, and cyan water-soluble dyes.

The yellow water-soluble dye includes, for example, C. I. Direct Yellow, C. I. Direct Orange, C. I. Acid Yellow, and C. I. Acid Orange. C. I. Direct Yellow includes, for example, C. I. Direct Yellows 12, 24, 26, 86, 98, 132, and 142. C. I. Direct Orange includes, for example, C. I. Direct Oranges 34, 39, 44, 46, and 60. C. I. Acid Yellow includes, for example, C. I. Acid Yellows 11, 17, 23, 25, 29, 42, 61, and 71. C. I. Acid Orange includes, for example, C. I. Acid Oranges 7 and 19.

The magenta water-soluble dye includes, for example, C. I. Direct Red, C. I. Direct Violet, C. I. Acid Red, C. I. Acid Violet, C. I. Basic Red, and C. I. Basic Violet. C. I. Direct Red includes, for example, C. I. Direct Reds 1, 4, 17, 28, 83, and 227. C. I. Direct Violet includes, for example, C. I. Direct Violets 47 and 48. C. I. Acid Red includes, for example, C. I. Acid Reds 1, 6, 32, 37, 51, 52, 80, 85, 87, 92, 94, 115, 180, 256, 289, 315, and 317. C. I. Acid Violet includes, for example, C. I. Acid Violet 49. C. I. Basic Red includes, for example, C. I. Basic Reds 1, 2, 9, 12, 13, 14, and 37. C. I. Basic Violet includes, for example, C. I. Basic Violets 7, 14, and 27.

The cyan water-soluble dye includes, for example, C. I. Direct Blue, C. I. Direct Green, C. I. Acid Blue, and C. I. Basic Blue. C. I. Direct Blue includes, for example, C. I. Direct Blues 6, 22, 25, 71, 86, 90, 106, and 199. C. I. Direct Green includes, for example, C. I. Direct Green 59. C. I. Acid Blue includes, for example, C. I. Acid Blues 9, 22, 40, 59, 93, 102, 104, 117, 120, 167, 229, and 234. C. I. Basic Blue includes, for example, C. I. Basic Blues 1, 3, 5, 7, 9, 24, 25, 26, 28, and 29.

Water-soluble dyes other than the yellow water-soluble dyes, the magenta water-soluble dyes, and the cyan water-soluble dyes include, for example, C. I. Direct Black, C. I. Direct Brown, C. I. Acid Black, C. I. Basic Black, and C. I. Food Black. C. I. Direct Black includes, for example, C. I. Direct Blacks 17, 19, 32, 51, 71, 108, 146, 154, and 168. C. I. Direct Brown includes, for example, C. I. Direct Brown 109. C. I. Acid Black includes, for example, C. I. Acid Blacks 2, 7, 24, 26, 31, 52, 63, 112, and 118. C. I. Basic Black includes, for example, C. I. Basic Black 2. C. I. Food Black includes, for example, C. I. Food Blacks 1 and 2.

The water-soluble dyes as exemplified above are excellent, for example, in the characteristics such as the vividness and the stability. One type of the water-soluble dye may be used in singly, or two or more types of the water-soluble dyes may be used in combination. The blending ratio (dye ratio) of the water-soluble dye with respect to the entire dye ink is not specifically limited. However, the blending ratio (dye ratio) is, for example, 0.1% by weight to 10% by weight, preferably 0.5% by weight to 8% by weight, and more preferably 0.5% by weight to 5% by weight.

Water is preferably ion-exchanged water or pure water (purified water). The blending ratio (water ratio) of water with respect to the entire ink is appropriately determined depending on, for example, the desired ink characteristics. The water ratio may be, for example, the balance of the other components.

The dye ink further contains the polymer having the lactam structure. The polymer having the lactam structure is as described above. The blending ratio (polymer ratio) of the polymer having the lactam structure with respect to the dye ink is appropriately determined depending on, for example, the weight average molecular weight of the polymer. The polymer ratio is, for example, 0.01% by weight to 5% by weight and preferably 0.05% by weight to 4% by weight. In order that the above-described effects of the present invention are fully realized, it is preferable that the polymer having the lactam structure is contained in the dye ink in an amount of 0.5% by weight to 3.0% by weight.

As described above, the dye ink has the satisfactory migration, because the dye ink contains the polymer having the lactam structure.

As described above, in the ink set of the present invention, it is preferable that the polymer having the lactam structure is contained in only the dye ink. Accordingly, it is possible to obtain the ink set in which the pigment ink has the higher optical density. However, the pigment ink may contain the polymer having the lactam structure in a range for maintaining a desirable value for the optical density (OD value) of the pigment ink. For example, the polymer having the lactam structure may be contained in the pigment ink in an amount of not more than 1.0% by weight, in particular, in an amount of not more than 0.5% by weight.

It is preferable that the dye ink further contains a water-soluble organic solvent. The water-soluble organic solvent is classified, for example, into the moistening agent which prevents the ink from being dried at an end portion (forward end portion) of the ink-jet head and the penetrant which adjusts the drying velocity on the recording paper surface.

The moistening agent is not limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketone alcohols such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylenes glycol, diethylene glycol, triethylene glycol, dipropylene glycol, tripropylene glycol, thiodiglycol, and hexylene glycol. In particular, it is preferable to use polyvalent alcohols such as alkylene glycol and glycerol. One type of the moistening agent as described above may be used singly, or two or more types of the moistening agents may be used in combination.

The blending ratio (moistening agent ratio) of the moistening agent with respect to the entire dye ink is not specifically limited. The blending ratio (moistening agent ratio) is, for example, 0% by weight to 95% by weight, preferably 5% by weight to 80% by weight, and more preferably 5% by weight to 50% by weight.

The penetrant is not limited, and includes, for example, glycol ether compounds. The glycol ether compound is not limited, and includes, for example, ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, and tripropylene glycol butyl ether. One type of the penetrant may be used singly, or two or more of the penetrants may be used in combination.

The blending ratio (penetrant ratio) of the penetrant with respect to the entire dye ink is not specifically limited. The blending ratio (penetrant ratio) is, for example, 0% by weight to 20% by weight. When the penetrant ratio is in the range described above, it is possible to obtain the more preferred permeability of the dye ink into the paper. The penetrant ratio is preferably 0.1% by weight to 15% by weight and more preferably 0.5% by weight to 10% by weight.

The dye ink may further contain a conventionally known additive, if necessary. The additive includes, for example, surfactants, viscosity-adjusting agents, surface tension-adjusting agents, and fungicides.

The dye ink can be prepared, for example, such that the water-soluble dye, water, the polymer having the lactam structure, and optionally other additive components are mixed uniformly or homogeneously by any conventionally known method, and undissolved matters are removed by a filter or the like.

It is especially preferable that the dye ink includes all of inks of three colors of yellow ink, magenta ink, and cyan ink. When all of the inks of three colors are included, it is possible to realize the adaptation to the full color recording. The dye ink may be constructed by only the inks of three colors. Alternatively, the dye ink may further include inks of other colors. The inks of other colors include, for example, black inks, red inks, green inks, blue inks, and light inks having low dye concentrations (light yellow inks, light magenta inks, light cyan inks, light black inks, light red inks, light green inks, and light blue inks).

Next, the pigment ink will be explained. As described above, the pigment ink contains the self-dispersible pigment and water. The self-dispersible pigment of the pigment ink is dispersible in water without any dispersing agent owing to the fact, for example, that at least one of the hydrophilic functional group and the salt thereof including, for example, carboxyl group, carbonyl group, hydroxyl group, and sulfon group is introduced into the surfaces of the pigment particles by the chemical bond directly or with any polyvalent group intervening therebetween.

The self-dispersible pigment is not limited. It is possible to use self-dispersible pigments subjected to the surface treatment by any one of methods described, for example, in Japanese Patent Application Laid-open No. 8-3498 and Published Japanese Translation of PCT International Publication for Patent Application No. 2000-513396. For example, any commercially available product may be used for the self-dispersible pigment. The commercially available product includes, for example, "CAB-O-JET (trade name) 200, 250, 260, 300, and 700" produced by Cabot Specialty Chemicals, "BONJET (trade name) BLACK CW-1, CW-2, AND CW-3" produced by Orient Chemical Industries, Ltd., and "LIOJET (trade name) WD BLACK 002C" produced by Toyo Ink Mfg. Co., Ltd. One type of the self-dispersible pigment may be used singly, or two or more types of the self-dispersible pigments may be used in combination.

The pigment, which is usable as the raw material for the self-dispersible pigment, is not limited. It is possible to use any one of inorganic pigments and organic pigments. The pigment, which is suitable to perform the surface treatment, includes, for example, carbon blacks such as "MA8 and 100" produced by Mitsubishi Chemical Corporation and "Color Black FW200" produced by Degussa.

The solid content blending ratio (pigment ratio) of the self-dispersible pigment with respect to the entire ink is not specifically limited. The solid content blending ratio (pigment ratio) is, for example, 1% by weight to 10% by weight, preferably 2% by weight to 9% by weight, and more preferably 3% by weight to 8% by weight.

Water and the blending ratio of water are the same as or equivalent to those of the dye ink described above.

The pigment ink further contains the substance having the surface active ability. As described above, it is preferable that the substance having the surface active ability is at least one of the penetrant and the surfactant.

The penetrant is the same as or equivalent to those of the dye ink described above. It is preferable that the penetrant is a glycol ether compound having a number of carbon atoms of a main chain of 5 to 10. The glycol ether compound, which has the number of carbon atoms of the main chain of 5 to 10, is not limited, and includes, for example, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, and tripropylene glycol methyl ether. One type of the penetrant may be used singly, or two or more types of the penetrants may be used in combination.

It is preferable that the surfactant is an acetylene diol compound. The acetylene diol compound is not limited. However, it is preferable to use an acetylene diol compound represented by the general formula (1).

In the general formula (1), m and n are numbers which satisfy m+n=0 to 50, and m and n may be identical with each other or different from each other. $R_1$, $R_2$, $R_3$, and $R_4$ are straight chain or branched chain alkyl groups having a number of carbon atom or atoms of 1 to 5 respectively. $R_1$, $R_2$, $R_3$, and $R_4$ may be identical with each other or different from each other.

In the general formula (1), m and n are more preferably numbers which satisfy m+n=1 to 30, and m and n are much more preferably numbers which satisfy m+n=1 to 10. The alkyl group includes, for example, methyl group, ethyl group, propyl group, isopropyl group, and butyl group.

For example, any commercially available product may be used for the acetylene diol compound. The commercially available product includes, for example, "Olfin (trade name) E1010" and "Olfin (trade name) E1004" as well as "Surfynol (trade name) 440" and "Surfynol (trade name) 465" produced by Nissin Chemical Industry Co., Ltd.; and "Acetylenol (trade name) E40" and "Acetylenol (trade name) E100" produced by Kawaken Fine Chemicals Co., Ltd.

The surfactants other than the acetylene diol compound include, for example, anionic surfactants produced by Kao Corporation such as "EMAL (trade name)" series, "LATEMUL (trade name)" series, "VENOL (trade name)" series, "NEOPELEX (trade name)" series, NS SOAP, KS SOAP, OS SOAP, "PELEX (trade name)" series and the like; anionic surfactants produced by Lion Corporation such as "LIPOLAN (trade name)" series, "LIPON (trade name)" series, "SUNNOL (trade name)" series, "LIPOTAC (trade name)" series, "ENAGICOL (trade name)" series, "LIPAL (trade name)" series, "LOTAT (trade name)" series and the like; nonionic surfactants produced by Kao Corporation such as "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series and the like; and nonionic surfactants produced by Lion Corporation such as "DOBANOX (trade name)" series, "LEOCOL (trade name)" series, "LEOX (trade name)" series, "LAOL (trade name)" series, "LEOCON (trade name)" series, "LIONOL (trade name)" series, "CADENAX (trade name)" series, "LIONON (trade name)" series, "LEOFAT (trade name)" series and the like.

One type of the surfactant may be used singly, or two or more types of the surfactants may be used in combination.

As for the substance having the surface active ability, for example, any one of the penetrant and the surfactant may be used singly, or the penetrant and the surfactant may be used in combination. As described above, the blending amount of the substance having the surface active ability is set in a ratio to fulfill such a condition that a line width of a one-dot line is not less than 115 µm when an amount of one liquid droplet of the pigment ink to be discharged is set to be within a range of 22 pL to 28 pL and the one-dot line is printed on a regular paper sheet. Accordingly, it is possible to obtain the ink set which is excellent in the permeability of the pigment ink. The upper limit value of the line width is not specifically limited. However, the upper limit value is, for example, 150 µm and preferably 130 µm.

The blending ratio (surface active substance ratio) of the substance having the surface active ability with respect to the entire pigment ink is preferably within a range of 1% by weight to 20% by weight, more preferably 2% by weight to 15% by weight, and much more preferably 3% by weight to 13% by weight. It is assumed that the penetrant and the surfactant are used in combination as the substances having the surface active ability. On this assumption, when the penetrant is blended in a relatively large amount, then the blending ratio (penetrant ratio) of the penetrant is preferably 5% by weight to 15% by weight, and the blending ratio (surfactant ratio) of the surfactant is preferably 0.1% by weight to 1% by weight. More preferably, the penetrant ratio is 5% by weight to 12% by weight, and the surfactant ratio is 0.2% by weight to 0.8% by weight. In a case that the surfactant is blended in a relatively large amount, then the penetrant ratio is preferably 1% by weight to 5% by weight, and the surfactant ratio is preferably 0.4% by weight to 2% by weight. More preferably, the penetrant ratio is 2% by weight to 4% by weight, and the surfactant ratio is 0.5% by weight to 1.5% by weight.

The pigment ink may further contain a moistening agent. The moistening agent and the blending ratio of the moistening agent are the same as or equivalent to those of the dye ink described above.

The pigment ink may further contain a conventionally known additive, if necessary. The additive includes, for example, viscosity-adjusting agents, surface tension-adjusting agents, and fungicides.

The pigment ink can be prepared, for example, such that the self-dispersible pigment, water, the substance having the surface active ability, and optionally other additive components are mixed uniformly or homogeneously by any conventionally known method, and undissolved matters are removed by a filter or the like.

Next, the ink-jet recording apparatus of the present invention will be explained. As described above, the ink-jet recording apparatus of the present invention is an ink-jet recording apparatus including an ink-accommodating section and an ink discharge section, and discharging inks accommodated in the ink-accommodating section by the ink discharge section; wherein the inks, which constitute the ink set for ink-jet recording of the present invention as defined above, are accommodated in the ink-accommodating section. Except for the foregoing features, the ink-jet recording apparatus of the present invention may be constructed, for example, in the same manner as any conventionally known ink-jet recording apparatus.

The ink-accommodating section includes, for example, an ink cartridge, etc. For example, any conventionally known body of the ink cartridge (ink cartridge body) can be used.

Figure 1:
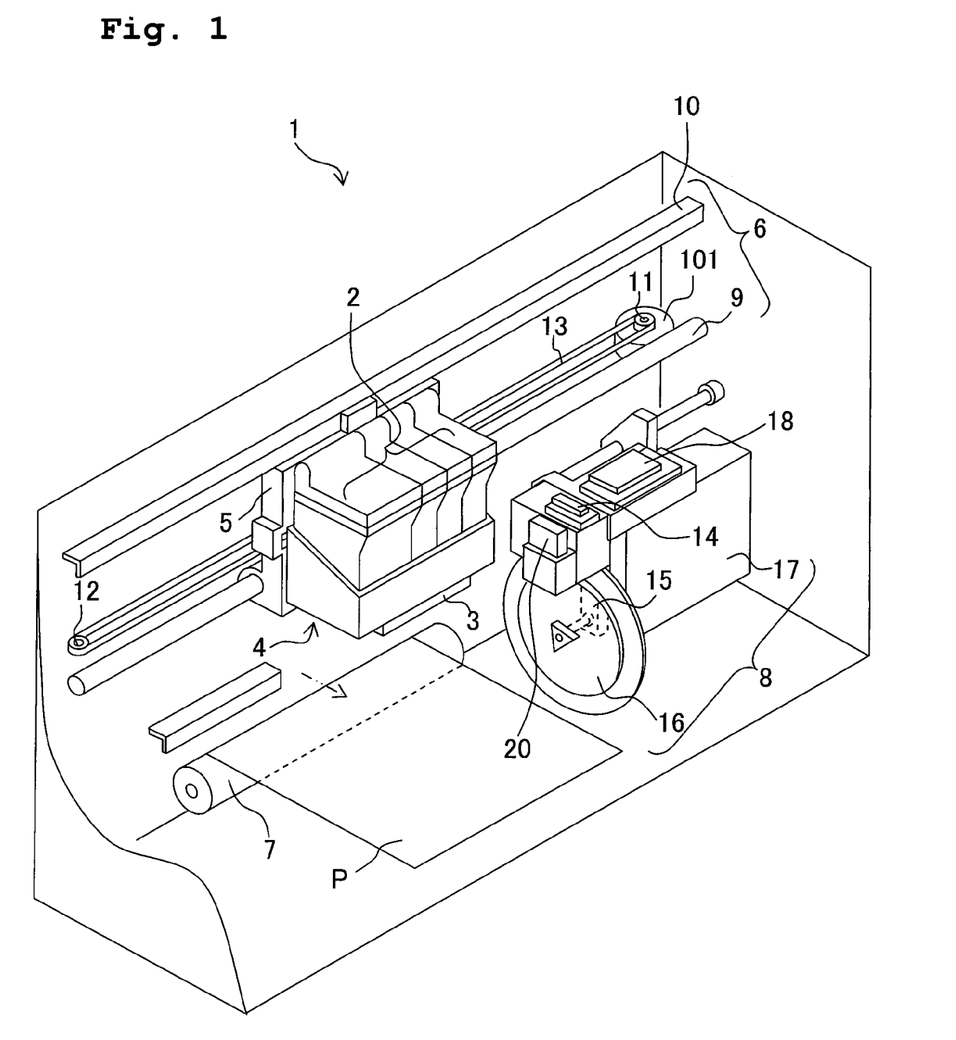
FIG. 1 shows a schematic perspective view illustrating an exemplary construction of an ink-jet recording apparatus of the present invention.

FIG. 1 shows an exemplary construction of the ink-jet recording apparatus of the present invention by way of example. As shown in FIG. 1, the ink-jet recording apparatus 1 includes, as main constitutive members, four ink cartridges 2, an ink-jet head 3, a head unit 4, a carriage 5, a driving unit 6, a platen roller 7, and a purge unit 8.

Each of the four ink cartridges 2 contains each one of the inks of four colors of yellow, magenta, cyan, and black. For example, the black ink is the pigment ink of the ink set of the present invention, and the yellow ink, the magenta ink, and the cyan ink are the dye inks of the ink set of the present invention. The ink-jet head 3 performs the printing on a recording medium P such as the printing paper. The head unit 4 is provided with the ink-jet head 3. The four ink cartridges 2 and the head unit 4 are provided on the carriage 5. The driving unit 6 reciprocatively moves (reciprocates) the carriage 5 in a linear direction. The platen roller 7 extends in the reciprocating direction of the carriage 5, and the platen roller 7 is arranged to be opposite to or to face the ink-jet head 3.

The driving unit 6 includes a carriage shaft 9, a guide plate 10, two pulleys 11, 12, and an endless belt 13. The carriage shaft 9 is arranged at a lower end portion of the carriage 5, and the carriage shaft 9 extends in parallel to the platen roller 7. The guide plate 10 is arranged at an upper end portion of the carriage 5, and the guide plate 10 extends in parallel to the carriage shaft 9. The two pulleys 11, 12 are arranged at both end portions of the carriage shaft 9 and between the carriage shaft 9 and the guide plate 10. The endless belt 13 is allowed to travel between the two pulleys 11, 12.

In the ink-jet recording apparatus 1, when the pulley 11 is rotated positively or reversely by the driving of a carriage motor 101, the carriage 5, which is joined to the endless belt 13, is reciprocatively moved in the linear direction along the carriage shaft 9 and the guide plate 10 in accordance with the positive or reverse rotation of the pulley 11.

The recording medium P is fed from a paper feed cassette (not shown) provided at a side portion or a lower portion of the ink-jet recording apparatus 1. The recording mechanism P is introduced into the space between the ink-jet head 3 and the platen roller 7. Accordingly, the predetermined printing is performed with the inks discharged from the ink-jet head 3 on the recording medium P. Afterwards, the recording medium P is discharged from the ink-jet recording apparatus 1. In FIG. 1, a paper feed mechanism and a paper discharge mechanism for the recording medium P are omitted from the illustration.

The purge unit 8 is provided on the side of the platen roller 7. The purge unit 8 is arranged so that the purge unit 8 is opposite to or facing the ink-jet head 3 when the head unit 4 is at a reset position (disposed over or above the purge unit 8 in this embodiment). The purge unit 8 includes a purge cap 14, a pump 15, a cam 16, and an ink storage section 17. The purge cap 14 covers a plurality of nozzles (not shown) of the ink-jet head 3 when the head unit 4 is at the reset position. The pump 15 sucks any defective ink containing bubbles or the like stored or accumulated in the ink-jet head 3, in accordance with the driving of the cam 16. Accordingly, the ink-jet head is restored. The sucked defective ink is stored in the ink storage section 17.

A wiper member 20 is arranged in the purge unit 8 to be adjacent to the purge unit 8, at a position of the purge unit 8 on the side of the platen roller 7. The wiper member 20 is formed to have a spatula-shaped form. The wiper member 20 performs wiping of a nozzle-formed surface, of the ink-jet head 3, in which the nozzles are formed, in accordance with the movement of the carriage 5. When the wiper 20 wipes the nozzle-formed surface, the pigment ink (black ink) and the dye inks (yellow ink, magenta ink and cyan ink) are brought in contact with the wiper 20, and these dye and pigment inks are mixed in the wiper member 20 and the nozzle-formed surface, in some cases. In the ink set of the present invention, however, the polymer having the lactam structure is contained in the dye ink as described above. Accordingly, even when the dye and pigment inks are brought in contact, the solidification of the inks due to the aggregation of the pigment is suppressed, and thus the clog-up of the nozzle is also prevented. With reference to FIG. 1, the cap 18 covers the plurality of nozzles of the ink-jet head 3, which are to be returned to the reset position when the printing is completed, in order to prevent the ink from being dried.

In the ink-jet recording apparatus 1 of this embodiment, the four ink cartridges 2 are provided on one carriage 5. However, the present invention is not limited to this. In the ink-jet recording apparatus of the present invention, the four ink cartridges may be provided on a plurality of carriages. The ink cartridges may be arranged and fixed in the ink-jet recording apparatus, rather than being provided on the carriage. In such an embodiment, for example, the ink cartridges are connected to the head unit provided on the carriage, for example, by tubes, and the inks are supplied from the ink cartridges to the head unit.

Next, the ink-jet recording method of the present invention will be explained. As described above, the ink-jet recording method of the present invention resides in an ink-jet recording method for performing recording on a surface of the recording medium by discharging inks, wherein the inks, which constitute the ink set for ink-jet recording as defined in the present invention, are used as the inks. The ink-jet recording method of the present invention can be carried out, for example, by using the ink-jet recording apparatus of the present invention described above. The other conditions of the ink-jet recording method of the present invention are the same as or equivalent to those of the ink set of the present invention described above.

EXAMPLES

Next, Examples of the present invention will be explained together with Comparative Examples. The present invention is neither limited to nor restricted by Examples and Comparative Examples described below at all.

(1) Preparation of Dye Inks

Ink composition components (Table 1) were mixed uniformly or homogeneously. After that, obtained mixtures were filtrated through a membrane filter (pore size: 20 μm) of the hydrophilic polytetrafluoroethylene (PTFE) type produced by Toyo Roshi Kaisha, Ltd., and thus dye inks M-1 to M-10 were obtained. In Table 1, magenta water-soluble dyes (1) to (3) are compounds represented by chemical formulas (2-1) to (2-3) respectively. In Table 1, the K-value of polyvinylpyrrolidone is the viscosity characteristic value which correlates with the weight average molecular weight. The relationship between the K-value and the weight average molecular weight is as follows.

| K-value | Weight average molecular weight |
|---------|--------------------------------|
| 12      | 2,000 to 3,000                 |
| 17      | 7,000 to 11,000                |
| 25      | 28,000 to 34,000               |
| 30      | 44,000 to 54,000               |

(2-1)

(2-2)

-continued (2-3)

solvents. Subsequently, the ink solvents were added little by little to CAB-O-JET (trade name) 300, followed by being mixed uniformly or homogeneously. After that, obtained mixtures were filtrated through a membrane filter (pore size 3.00 μm) of the cellulose acetate type produced by Toyo Roshi Kaisha, Ltd., and thus pigment inks B-1 to B-9 were obtained. Each of the pigment inks B-5 to B-9 contained polyvinylpyrrolidone (K value=12).

TABLE 1

|  | M-1 | M-2 | M-3 | M-4 | M-5 | M-6 | M-7 | M-8 | M-9 | M-10 |
|---|---|---|---|---|---|---|---|---|---|---|
| Magenta water-soluble dye (1) | 3.0 | — | 3.0 | — | — | — | 3.0 | — | — | — |
| Magenta water-soluble dye (2) | — | 3.0 | — | — | — | 3.0 | — | 3.0 | 3.0 | — |
| Magenta water-soluble dye (3) | — | — | — | 3.0 | 3.0 | — | — | — | — | 3.0 |
| Glycerol | 16.8 | 22.3 | 25.0 | 16.2 | 20.0 | 22.3 | 15.7 | 21.3 | 24.7 | 16.8 |
| Dipropylene glycol propyl ether | 2.0 | 2.0 | 0.9 | 2.0 | 0.9 | 2.0 | 2.0 | 2.0 | 2.0 | 2.0 |
| Triethylene glycol butyl ether | — | — | 1.5 | — | 1.5 | — | — | — | — | — |
| SUNNOL (trade name) NL1430*[1] | 1.0 (0.28) | 1.0 (0.28) | 1.0 (0.28) | 1.0 (0.28) | 1.0 (0.28) | 1.0 (0.28) | 1.0 (0.28) | 1.0 (0.28) | 1.0 (0.28) | 1.0 (0.28) |
| Olfin (trade name) E1010*[2] | 0.9 | 0.9 | 0.2 | 0.9 | 0.2 | 0.9 | 0.9 | 0.9 | 0.9 | 0.9 |
| Polyvinylpyrrolidone K-value 12 | 3.0 | 1.0 | 1.0 | — | — | — | — | — | — | — |
| Polyvinylpyrrolidone K-value 15 | — | — | — | 3.0 | 3.0 | 1.0 | — | — | — | — |
| Polyvinylpyrrolidone K-value 17 | — | — | — | — | — | — | 3.0 | 1.0 | — | — |
| Polyvinylpyrrolidone K-value 30 | — | — | — | — | — | — | — | — | — | 0.5 |
| Water | balance | balance | balance | balance | balance | balance | balance | balance | balance | balance |

*[1]Sodium polyoxyethylene alkyl (12, 13) ether sulfate (3E.O.), active ingredient amount: 28% by weight, produced by Lion Corporation (parenthesized numerals indicate active ingredient amounts).
*[2]Surfactant represented by general formula (1) (ethylene oxide (10 mol) adduct of acetylene diol), produced by Nissin Chemical Industry Co., Ltd.

(2) Preparation of Pigment Ink

Components except for CAB-O-JET (trade name) 300, which were included in ink composition components (Table 2), were mixed uniformly or homogeneously to obtain ink

TABLE 2

|  | B-1 | B-2 | B-3 | B-4 | B-5 | B-6 | B-7 | B-8 | B-9 |
|---|---|---|---|---|---|---|---|---|---|
| CAB-O-JET (trade name) 300*[3] | 25.8 (3.87) | 25.8 (3.87) | 25.8 (3.87) | 25.8 (3.87) | 25.8 (3.87) | 25.8 (3.87) | 25.8 (3.87) | 25.8 (3.87) | 25.8 (3.87) |
| Glycerol | 20.4 | 20.0 | 14.6 | 21.2 | 17.9 | 19.1 | 20.2 | 18.9 | 15.7 |
| Dipropylene glycol propyl ether | 2.3 | 5.0 | 10.0 | 2.3 | 5.0 | 2.3 | 5.0 | 5.0 | 5.0 |
| SUNNOL (trade name) NL1430*[1] | 0.2 (0.056) | 0.2 (0.056) | 0.2 (0.056) | 0.2 (0.056) | 0.2 (0.056) | 0.2 (0.056) | 0.2 (0.056) | 0.2 (0.056) | 0.2 (0.056) |
| Olfin (trade name) E1010*[2] | 1.00 | 0.15 | 0.15 | 0.15 | 0.15 | 0.15 | 0.15 | 0.15 | 0.15 |
| Polyvinyl-pyrrolidone K-value 12 | — | — | — | — | 1.0 | 1.0 | 0.1 | 0.5 | 2.0 |
| Water | balance | balance | balance | balance | balance | balance | balance | balance | balance |

*[1]Sodium polyoxyethylene alkyl (12, 13) ether sulfate (3E.O.), active ingredient amount: 28% by weight, produced by Lion Corporation (parenthesized numerals indicate active ingredient amounts).
*[2]Surfactant represented by general formula (1) (ethylene oxide (10 mol) adduct of acetylene diol), produced by Nissin Chemical Industry Co., Ltd.
*[3]Self-dispersible black pigment, produced by Cabot Specialty Chemicals, pigment solid content: 15% by weight (parenthesized numerals indicate pigment solid content amounts).

Example 1

Twenty-four types of ink sets for ink-jet recording were obtained by combining the dye inks M-1 to M-8 and the pigment inks B-1 to B-3 respectively.

Example 2

Sixteen types of ink sets for ink-jet recording were obtained by combining the dye inks M-1 to M-8 and the pigment inks B-7 and B-8 (which contain polyvinylpyrrolidone) respectively.

Example 3

Eight types of ink sets for ink-jet recording were obtained by combining the dye inks M-1 to M-8 and the pigment ink B-5 (which contains polyvinylpyrrolidone) respectively.

Comparative Example 1

Three types of ink sets for ink-jet recording were obtained by combining the dye ink M-9 and the pigment inks B-1 to B-3 respectively.

Comparative Example 2

Eight types of ink sets for ink-jet recording were obtained by combining the dye inks M-1 to M-8 and the pigment ink B-4 respectively.

Comparative Example 3

An ink set for ink-jet recording was obtained by combining the dye ink M-10 and the pigment ink B-4.

Comparative Example 4

An ink set for ink-jet recording was obtained by combining the dye ink M-9 and the pigment ink B-4.

Comparative Example 5

Eight types of ink sets for ink-jet recording were obtained by combining the dye inks M-1 to M-8 and the pigment ink B-6 respectively.

Comparative Example 6

An ink set for ink-jet recording was obtained by combining the dye ink M-10 and the pigment ink B-6.

Comparative Example 7

An ink set for ink-jet recording was obtained by combining the dye ink M-9 and the pigment ink B-5.

Comparative Example 8

An ink set for ink-jet recording was obtained by combining the dye ink M-9 and the pigment ink B-6.

Comparative Example 9

Eight types of ink sets for ink-jet recording were obtained by combining the dye inks M-1 to M-8 and the pigment ink B-9 respectively.

Comparative Example 10

An ink set for ink-jet recording was obtained by combining the dye ink M-9 and the pigment ink B-9.

Comparative Example 11

An ink set for ink-jet recording was obtained by combining the dye ink M-10 and the pigment ink B-9.

Various characteristics and physical properties of the ink sets of respective Examples and respective Comparative Examples were evaluated or measured by the following methods.

(a) Permeability of Pigment Ink (Line Width)

One-dot line was printed at a resolution of 600 dpi×300 dpi on a regular paper sheet (Laser Print produced by Hammermill) by using each of the pigment inks constructing the ink sets of respective Examples and respective Comparative Examples, while setting the amount of one liquid droplet to be within a range of 22 pL to 28 pL by using a digital multifunction machine DCP-330C provided with an ink-jet printer produced by Brother Industries, Ltd. The line width of the one-dot line was measured by Personal IAS produced by QEA, and the evaluation was made in accordance with the following evaluation criterion.

Evaluation Criterion for Permeability of Pigment Ink (Line Width)

G: Line width was not less than 115 μm.

NG: Line width was less than 115 μm.

(b) Vaporization Test for Mixture of Pigment Ink and Dye Ink 2.5 g of the pigment ink and 2.5 g of the dye ink constructing each of the ink sets of respective Examples and respective Comparative Examples were mixed with each other, and an obtained mixture was poured into an open vial (diameter: 20.2 mm). The open vial was stored for 5 days in a thermostatic chamber at a temperature of 60° C. and a relative humidity of 40%. After the storage, the state of the inks in the open vial was visually observed, and the evaluation was made in accordance with the following evaluation criterion.

Evaluation Criterion for Vaporization Test for Mixture of Pigment Ink and Dye Ink G: Fluidity was confirmed (inks were moved when the open vial was inclined).

NG: Fluidity was not confirmed (inks were not moved even when the open vial was inclined).

(c) Migration of Dye Ink

The tri-color black was printed by the solid printing (at a resolution of 1,200 dpi×2,400 dpi or 100% duty) on a glossy paper sheet ("Photo Paper CRISPIA<high glossy>" produced by Seiko Epson Corporation) by using each of the dye inks (magenta inks) of respective Examples and respective Comparative Examples as well as dye inks of two colors of yellow ink and cyan ink by using a digital multifunction machine DCP-330C provided with an ink-jet printer produced by Brother Industries, Ltd., followed by being stored for 3 days in a thermostatic chamber at a temperature of 30° C. and a relative humidity of 80%. After the storage, the observation was performed visually, and the evaluation was made in accordance with the following evaluation criterion. A yellow ink (dye ink), with which an ink cartridge LC10Y produced by Brother Industries, Ltd. was filled, was used for the yellow ink. A cyan ink (dye ink), with which an ink cartridge LC10C produced by Brother Industries, Ltd. was filled, was used for the cyan ink. The term "duty" in "100% duty" described above is the value calculated in accordance with the following expression (I). The term "100% duty" means the maximum ink weight of the single color with respect to the pixel.

duty (%)={actual printing dot number/(vertical resolution×horizontal resolution)}×100    (I)

Actual printing dot number: number of actual printing dots per unit area.
Vertical resolution: vertical resolution per unit area.
Horizontal resolution: horizontal resolution per unit area.
Evaluation Criterion for Migration of Dye Ink mixture of the pigment ink and the dye ink, and the migration of the dye ink were "G", and the OD value of the pigment ink was "B".

NG: One or more of the evaluation results of the permeability (line width) of the pigment ink, the vaporization test for the mixture of the pigment ink and the dye ink, and the migration of the dye ink was/were "NG", or the OD value of the pigment ink was "C".

Evaluation results of the ink sets of respective Examples and respective Comparative Examples are shown in Table 3.

TABLE 3

| | Ink set | | Permeability of Pigment ink | Vaporization test for mixture of pigment | Migration of | Optical density (OD) value of | Overall |
|---|---|---|---|---|---|---|---|
| | Dye ink | pigment ink | (line width) | ink/dye ink | dye ink | pigment ink | evaluation |
| Example 1 | M-1 to M-8 | B-1 to B-3 | G | G | G | A | VG |
| Example 2 | M-1 to M-8 | B-7, B-8 | G | G | G | A | VG |
| Example 3 | M-1 to M-8 | B-5 | G | G | G | B | G |
| Comp. Ex. 1 | M-9 | B-1 to B-3 | G | NG | NG | A | NG |
| Comp. Ex. 2 | M-1 to M-8 | B-4 | NG | G | G | A | NG |
| Comp. Ex. 3 | M-10 | B-4 | NG | NG | G | A | NG |
| Comp. Ex. 4 | M-9 | B-4 | NG | G | NG | A | NG |
| Comp. Ex. 5 | M-1 to M-8 | B-6 | NG | G | G | B | NG |
| Comp. Ex. 6 | M-10 | B-6 | NG | NG | G | B | NG |
| Comp. Ex. 7 | M-9 | B-5 | G | G | NG | B | NG |
| Comp. Ex. 8 | M-9 | B-6 | NG | G | NG | B | NG |
| Comp. Ex. 9 | M-1 to M-8 | B-9 | G | G | G | C | NG |
| Comp. Ex. 10 | M-9 | B-9 | G | G | NG | C | NG |
| Comp. Ex. 11 | M-10 | B-9 | G | NG | G | C | NG |

G: Magenta ink was not blurred to the circumferential edge of the printing portion of the tri-color black.
NG: Magenta ink was blurred to the circumferential edge of the printing portion of the tri-color black.
(d) Optical Density (OD) Value of Pigment Ink An evaluation sample was prepared by performing the printing at a resolution of 600 dpi×600 dpi (amount of one liquid droplet: 22 pL to 28 pL) on a regular paper sheet (Laser Print produced by Hammermill) by using each of the pigment inks constructing the ink sets of respective Examples and respective Comparative Examples by using a digital multi-function machine DCP-330C provided with an ink-jet printer produced by Brother Industries, Ltd. The optical density (OD) value of the evaluation sample was measured by using a spectrophotometric colorimetry meter Spectrolino (light source: $D_{50}$, field: 2°, ANSI T) produced by Gretag Macbeth, and the evaluation was made in accordance with the following evaluation criterion.
Evaluation Criterion for Optical Density (OD) Value of Pigment Ink
A: OD value was not less than 1.3.
B: OD value was not less than 1.2 to less than 1.3.
C: OD value was less than 1.2.
(e) Overall Evaluation The overall evaluation was performed in accordance with the following evaluation criterion for the ink sets of respective Examples and respective Comparative Examples.
Evaluation Criterion for Overall Evaluation
VG (Very Good): All of the evaluation results of the permeability (line width) of the pigment ink, the vaporization test for the mixture of the pigment ink and the dye ink, and the migration of the dye ink were "G", and the OD value of the pigment ink was "A".
G (Good): All of the evaluation results of the permeability (line width) of the pigment ink, the vaporization test for the As shown in Table 3, all of the evaluation results, which related to the permeability of the pigment ink (line width), the vaporization test for the mixture of pigment ink/dye ink, the migration of the dye ink were good or satisfactory in all of the twenty-four types of ink sets of Example 1 and all of the sixteen types of ink sets of Example 2 and all of the eight types of ink sets of Example 3 in which the polymer having the lactam structure was blended in the dye ink and the sufficient amount of the substance having the surface active ability was blended in the pigment ink.

The evaluation results, which related to the optical density (OD) value of the pigment ink, were also good or satisfactory in all of the twenty-four types of ink sets of Example 1 in which the polymer having the lactam structure was contained in only the dye ink. Although the ink sets of Example 2 use the pigment ink B-7, B-8 containing polyvinylpyrrolidone, the contents of polyvinylpyrrolidone were 0.1% and 0.5% by weight, respectively, each of which was a small amount, and thus the evaluation results relating to the optical density (OD) value of the pigment ink was also satisfactory. Since the ink sets of Example 3 use the pigment ink B-5 containing polyvinylpyrrolidone in amount of 1.0% by weight which was a relatively large amount, it is considered that the optical density (OD) value of the pigment ink is lowered as compared with the ink sets of Example 1 and Example 2. This is also appreciated from the evaluation results of Comparative Examples 5, 6 and 8 using the pigment ink B-6 containing polyvinylpyrrolidone; and from the evaluation results of Comparative Examples 9-11 using the pigment ink B-9 containing polyvinylpyrrolidone. In particular, in Comparative Examples 9-11, since polyvinylpyrrolidone was contained in the pigment ink in an amount of 2.0% by weight, the evaluation result relating to the OD value was the lowest level. From these evaluation results, it is preferable that the content of polyvinylpyrrolidone is not more than 1.0% by weight, more preferably the content of polyvinylpyrrolidone is not more than 0.5% by weight.

On the other hand, the evaluation results of Comparative Examples 1, 4, 7, 8 and 10, in each of which the dye ink did not contain the polymer having the lactam structure, are as follows. The evaluation results, which related to the vaporization test for the mixture of pigment ink/dye ink and the migration of the dye ink, were inferior in all of the three types of ink sets of Comparative Example 1 in which the blending ratio of the substance having the surface active ability was high in the pigment ink and the dye ink did not contain the polymer having the lactam structure. The evaluation results, which related to the permeability of the pigment ink (line width) and the migration of the dye ink, were inferior in the ink set of Comparative Example 4 in which the blending ratio of the substance having the surface active ability was low in the pigment ink and the dye ink did not contain the polymer having the lactam structure. The evaluation result, which related to the migration of the dye ink, was inferior in the ink set of Comparative Example 7 in which the blending ratio of the substance having the surface active ability was high in the pigment ink, the pigment ink contained the polymer having the lactam structure, and the dye ink did not contain the polymer having the lactam structure. The evaluation results, which related to the permeability of the pigment ink (line width) and the migration of the dye ink, were inferior in the ink set of Comparative Example 8 in which the blending ratio of the substance having the surface active ability was low in the pigment ink, the pigment ink contained the polymer having the lactam structure, and the dye ink did not contain the polymer having the lactam structure. Note that in Comparative Example 10, the dye ink did not contain the polymer having the lactam structure, the pigment ink contained the polymer having the lactam structure in a large amount. Therefore, Comparative Example 10 had a satisfactory evaluation results relating to the vaporization test for the mixture of pigment ink/dye ink.

As appreciated from Comparative Examples 2, 3, 5 and 6, even in a case that the dye ink contained the polymer having the lactam structure, the evaluation results, which related to the permeability of the pigment ink (line width) and/or the vaporization test for the mixture of pigment ink/dye ink, were inferior. The evaluation results, which related to the permeability of the pigment ink (line width), were inferior in all of the eight types of ink sets of Comparative Example 2 in which the blending ratio of the substance having the surface active ability was low in the pigment ink. The evaluation results, which related to the permeability of the pigment ink (line width) and the vaporization test for the mixture of pigment ink/dye ink, were inferior in the ink set of Comparative Example 3 in which the blending ratio of the substance having the surface active ability was low in the pigment ink and the weight average molecular weight of the polymer having the lactam structure blended in the dye ink was not less than 25,000. The evaluation results, which related to the permeability of the pigment ink (line width), were inferior in all of the eight types of ink sets of Comparative Example 5 in which the blending ratio of the substance having the surface active ability was low in the pigment ink and the pigment ink contained the polymer having the lactam structure. The evaluation results, which related to the permeability of the pigment ink (line width) and the vaporization test for the mixture of pigment ink/dye ink, were inferior in the ink set of Comparative Example 6 in which the blending ratio of the substance having the surface active ability was low in the pigment ink, the pigment ink contained the polymer having the lactam structure, and the weight average molecular weight of the polymer having the lactam structure blended in the dye ink was not less than 25,000. As appreciated from the above evaluation results, the blending of the polymer having the lactam structure in the dye ink is generally effective in the prevention of the ink solidification when the dye and pigment inks are brought in contact with each other. However, even when the polymer having the lactam structure is contained in the dye ink, in particular, the amount of the surfactant affects the permeability of the pigment ink, namely the line width. Therefore, it is preferable that, in the pigment ink, the substance having the surface active ability is blended in a ratio to fulfill the condition that the line width of a one-dot line is not less than 115 µm when an amount of one liquid droplet of the pigment ink to be discharged is set to be within a range of 22 pL to 28 pL and the one-dot line is printed on a regular paper sheet.

Throughout all the examples and comparative examples, it is appreciated that the dye ink containing the polymer having the lactam structure is excellent in the suppression of the migration, as compared with the dye ink (M-9) not containing the polymer having the lactam structure. Therefore, regarding not only the dye ink which constitutes the ink set in combination with the pigment ink, but regarding also the dye ink itself, the dye ink containing the polymer having the lactam structure is effective in the suppression of the migration.

As described above, in the ink set for ink-jet recording of the present invention, the permeability and the optical density of the pigment ink are high, any discharge failure, which would be otherwise caused by the clog-up of the nozzle of the ink-jet head, is not caused even when the pigment ink and the dye ink are brought in contact with each other in the vicinity of the nozzle of the ink-jet head. Further, the dye ink of the present invention is good or satisfactory regarding the migration. The way of use of the ink set for ink-jet recording of the present invention is not limited. The ink set for ink-jet recording of the present invention is widely applicable to various types of the ink-jet recording.

What is claimed is:

1. An ink set for ink jet recording comprising a dye ink which contains a water-soluble dye and water and a pigment ink which contains a self-dispersible pigment and water;
   wherein the dye ink further contains a polymer having a lactam structure in an amount of 1% by weight to 3% by weight; and the pigment ink further contains a substance having a surface active ability and does not contain a polymer having a lactam structure;
   wherein the substance having the surface active ability includes (i) a penetrant which is a glycol ether compound having a number of carbon atoms of a main chain of 5 to 10, and (ii) a surfactant which includes an acetylene diol compound; and
   wherein the following Condition (I) or Condition (II) is fulfilled:
   Condition (I): the penetrant is contained in an amount of 5% by weight to 15% by weight and the surfactant is contained in an amount of 0.1% by weight to 1% by weight in the pigment ink;
   Condition (II): the penetrant is contained in an amount of 1% by weight to 5% by weight and the surfactant is contained in an amount of 0.4% by weight to 2% by weight in the pigment ink.

2. The ink set for ink-jet recording according to claim 1, wherein the lactam structure is a γ-lactam structure.

3. The ink set for ink jet recording according to claim 2, wherein the polymer, which has the γ-lactam structure, has a weight average molecular weight of less than 25,000.

4. The ink set for ink-jet recording according to claim 2, wherein the polymer, which has the y-lactam structure, is polyvinylpyrrolidone.

5. The ink set for ink jet recording according to claim 1, wherein the self-dispersible pigment is a self-dispersible black pigment, and the dye ink includes at least one water-soluble dye selected from the group consisting of yellow water-soluble dyes, magenta water-soluble dyes, and cyan water-soluble dyes.

6. An ink jet recording apparatus comprising an ink-accommodating section and an ink discharge section; wherein the inks, which constitute the ink set for ink jet recording as defined in claim 1, are present in the ink-accommodating section.

7. An ink jet recording method for performing recording on a surface of a recording medium by discharging inks, wherein the inks, which constitute the ink set for ink jet recording as defined in claim 1, are used as the inks.

8. The ink set for ink jet recording according to claim 1,
- wherein the self-dispersible pigment is a self-dispersible black pigment;
- the dye ink includes at least one water-soluble dye selected from the group consisting of yellow water-soluble dyes, magenta water-soluble dyes, and cyan water-soluble dyes; and
- the polymer is polyvinylpyrrolidone which has a weight average molecular weight of not less than 2000 and not more than 11000.

\* \* \* \* \*